US012264832B2

(12) United States Patent
Wootton et al.

(10) Patent No.: US 12,264,832 B2
(45) Date of Patent: *Apr. 1, 2025

(54) SYSTEMS FOR AND METHODS OF AUTOMATICALLY SCHEDULING AND EXECUTING IN SITU TESTS ON ELECTRICAL AND MECHANICAL SYSTEMS

(71) Applicant: Nextracker LLC, Fremont, CA (US)

(72) Inventors: Bruce Christopher Wootton, Alameda, CA (US); Rory Joseph Timar, San Francisco, CA (US); Colin Patrick Murphy, Oakland, CA (US); Francesco Borrelli, Kensington, CA (US); Allan Daly, Albany, CA (US)

(73) Assignee: NEXTRACKER LLC, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/442,473

(22) Filed: Feb. 15, 2024

(65) Prior Publication Data
US 2024/0263821 A1 Aug. 8, 2024

Related U.S. Application Data

(63) Continuation of application No. 17/176,477, filed on Feb. 16, 2021, now Pat. No. 11,933,511, which is a
(Continued)

(51) Int. Cl.
*F24F 11/30* (2018.01)
*F24F 11/48* (2018.01)
(Continued)

(52) U.S. Cl.
CPC .............. *F24F 11/49* (2018.01); *F24F 11/30* (2018.01); *F24F 11/48* (2018.01); *F24F 11/52* (2018.01);
(Continued)

(58) Field of Classification Search
CPC .. F24F 11/48; F24F 11/30; F24F 11/49; F24F 11/52; F24F 11/61; F24F 11/63;
(Continued)

(56) References Cited

U.S. PATENT DOCUMENTS

| 5,745,390 A * | 4/1998 | Daneshgari | G05B 23/0251 700/109 |
| 8,657,035 B2 * | 2/2014 | Latrille | G01V 11/002 175/57 |

(Continued)

FOREIGN PATENT DOCUMENTS

| CN | 103425055 A | 12/2013 |
| CN | 103650109 A | 3/2014 |

(Continued)

OTHER PUBLICATIONS

PCT, International Search Report dated Mar. 17, 2017, International application No. PCT/US2016/064263, filed Nov. 20, 2016, Wootton et al., 17 pages.

(Continued)

*Primary Examiner* — Jeffrey P Aiello
(74) *Attorney, Agent, or Firm* — Fredrikson & Byron, P.A.

(57) ABSTRACT

A testing platform tests an electrical and mechanical system such as an HVAC unit according to an algorithm that reduces the total testing time of the components of the system, while ensuring the safety of the system during system-wide testing. The platform uses constraints that are checked both before and during the testing to ensure that HVAC operating conditions are acceptable for starting and maintaining component tests. Preferably, the platform uses finite-state machines for each device to organize the component tests, allowing for monitoring of constraints and starting, pausing, and stopping component tests. Preferably, total test execution time is reduced by running component tests in parallel,
(Continued)

running component tests based on loads of the components, or combinations of both.

16 Claims, 6 Drawing Sheets

Related U.S. Application Data continuation of application No. 16/806,522, filed on Mar. 2, 2020, now Pat. No. 10,921,007, which is a continuation of application No. 15/365,758, filed on Nov. 30, 2016, now Pat. No. 10,578,327.

(60) Provisional application No. 62/261,205, filed on Nov. 30, 2015.

(51) Int. Cl.
| | |
|---|---|
| *F24F 11/49* | (2018.01) |
| *F24F 11/52* | (2018.01) |
| *F24F 11/61* | (2018.01) |
| *F24F 11/63* | (2018.01) |
| *G05B 23/02* | (2006.01) |

(52) U.S. Cl.
CPC ............ *F24F 11/61* (2018.01); *F24F 11/63* (2018.01); *G05B 23/0251* (2013.01); *G05B 23/0256* (2013.01); *G05B 2219/24053* (2013.01); *G05B 2219/2614* (2013.01)

(58) Field of Classification Search
CPC .. G05B 2219/24053; G05B 2219/2614; G05B 23/0251; G05B 23/0256
USPC ...... 700/276, 83, 1; 702/115, 182, 188, 183, 702/108, 119, 123, 120, 184, 33, 34, 127, 702/57, 58, 113; 717/124, 135
See application file for complete search history.

(56) References Cited

U.S. PATENT DOCUMENTS

| | | | | |
|---|---|---|---|---|
| 8,793,114 | B2* | 7/2014 | Shafer | G05B 23/0256 703/10 |
| 2005/0189142 | A1 | 9/2005 | Garcia et al. | |
| 2008/0234967 | A1* | 9/2008 | Vandewiele | G01R 31/31835 702/119 |
| 2012/0054756 | A1* | 3/2012 | Arnold | G06F 9/4881 718/102 |
| 2014/0173351 | A1* | 6/2014 | Afifi | G06F 11/24 714/37 |
| 2015/0178421 | A1* | 6/2015 | Borrelli | G06F 30/13 703/7 |
| 2015/0226013 | A1* | 8/2015 | Kirkhope | E21B 12/02 702/6 |
| 2015/0241856 | A1* | 8/2015 | Walser | G05B 19/048 700/275 |
| 2015/0275656 | A1* | 10/2015 | Holt | E21B 47/12 340/855.4 |

FOREIGN PATENT DOCUMENTS

| | | |
|---|---|---|
| CN | 103890597 A | 6/2014 |
| GB | 2508858 A | 6/2014 |

OTHER PUBLICATIONS

Extended European Search Report issued in corresponding European Patent Application No. 16871443.4 dated Sep. 27, 2019, 11 pages.
First Office Action issued in Chinese Patent Application No. 201680079165.X dated Dec. 4, 2019 with English translation, 37 pages.
Examination Report issued in India Application No. 201817020697 dated Nov. 11, 2020, 6 pages.
Notification to Grant Patent Right for Invention issued in Chinese patent application No. 201680079165.X dated Jun. 3, 2020, 4 pages.
Chinese Office Action with Search Report issued in Chinese Patent application No. 202010829806.7 dated May 12, 2021 with English translation of office action, 16 pages.
Communication pursuant to Article 94(3) EPC issued in European Patent application No. 16871443.4 dated Jan. 28, 2021, 4 pages.
Brazlian Office Action issued in Brazilian Patent Application No. 112018010915 dated May 21, 2020, 6 pages.
Australian Examination Report issued in Australian Patent Application No. 2016365301 dated Dec. 17, 2020, 5 pages.
Examination Report No. 1 issued in Australian Patent Application No. 2021261889 dated Nov. 2, 2022, 4 pages.

\* cited by examiner

Table 1

| Equipment \ Time | T1 | T2 | T3 | T4 | T5 |
|---|---|---|---|---|---|
| VAVC-1 | Test 1 | Safety Set | Safety Set | | |
| VAVC-2 | Test 1 | Test 2 | Idle | | |
| VAVC-3 | Safety Set | Test 1 | Test 2 | Test 3 | |

Fig. 4A

Table 2

| Equipment \ Time | T1 | T2 | T3 | T4 | T5 |
|---|---|---|---|---|---|
| VAVC-1 | Safety Set | Safety Set | Test 1 | | |
| VAVC-2 | Test 1 | Test 2 | Safety Set | | |
| VAVC-3 | Test 1 | Test 2 | Test 3 | | |

Fig. 4B

SYSTEMS FOR AND METHODS OF AUTOMATICALLY SCHEDULING AND EXECUTING IN SITU TESTS ON ELECTRICAL AND MECHANICAL SYSTEMS

CROSS-REFERENCE TO RELATED APPLICATIONS

This patent application is a continuation of U.S. patent application Ser. No. 17/176,477 filed Feb. 16, 2021 which is a continuation of U.S. patent application Ser. No. 16/806,522 filed Mar. 2, 2020, now U.S. Pat. No. 10,921,007, which is continuation of U.S. patent application Ser. No. 15/365,758 filed Nov. 30, 2016, now U.S. Pat. No. 10,578,327, which claims priority to U.S. Provisional Patent Application No. 62/261,205 filed Nov. 30, 2015, and titled "An Automated System for Scheduling and Executing In Situ Tests on Mechanical (HVAC) Systems," all of which are hereby incorporated by reference in their respective entireties.

FIELD OF THE INVENTION

This invention is related to testing systems. More particularly, this invention is related to in situ testing of electrical and mechanical systems, such as HVAC systems.

BACKGROUND OF THE INVENTION

Testing custom complex deployments presents a challenge because individually testing components will not reveal errors in system integration. Examples of a complex systems include electrical, mechanical, electro-mechanical, and HVAC systems. (To simplify the discussion below, these systems are referred to as electrical and mechanical systems.) Instead, the components must be tested in place (in situ) to ensure that the system as a whole works as desired. Testing a single system component must take into account and possibly modify the operating conditions of the system as a whole. In a system with a large number of components and tests, this results in a complex testing procedure that can take a relatively long time to complete because each component test requires establishing a new set of operating conditions. In addition, if tests will be run on a currently operating system, the ability to establish arbitrary operating conditions is limited. Although tools exist that allow automated establishment of operating conditions, these tools lack the ability to coordinate and validate multiple operating conditions across multiple tests.

BRIEF SUMMARY OF THE INVENTION

In accordance with the principles of the invention, an electrical and mechanical system having multiple components is tested by dynamically coordinating component tests to account for system conditions. A testing system uses a scheduling algorithm that minimizes the total run time of the component tests, such as by executing tests that can be run in parallel, together, while managing and monitoring the validity of the operating conditions of the electrical and mechanical system. Preferably, the testing system implements lifecycle management for tests and operating conditions using well-defined finite-state machines (FSMs), allowing for pausing, canceling, restarting, and recovering of tests and conditions.

In a first aspect, a method of testing an electrical and mechanical system that includes interconnected devices, each device including one or more components, each component tested using a corresponding component test, includes grouping the components into groups such that all components in each of the groups are able to be tested in parallel; and dynamically scheduling execution of the component tests based on criteria comprising the groupings and constraints for maintaining execution of the component tests to minimize a total execution time of the component tests. The criteria also include states of each of the one or more components. Preferably, the component tests are scheduled in an order of decreasing loads on the devices. As one example, as used herein, loads refer to computational, mechanical, or electrical loads on the devices, or any combination thereof.

The method also includes executing the component tests based on the scheduling, and automatically monitoring changes in the states of the components and updating at least one of the constraints based on any changes.

In one embodiment, the method also includes selecting a first set of the components for testing based on loads on the devices; selecting a second set of the components for testing only after testing of the first set of components is completed; and selecting constraints to delay testing of the second set of components only after testing of the first set of components is completed.

Preferably, the method also includes detecting that one of the components is unresponsive to a corresponding component test; placing the unresponsive component into a recovery state; and updating the constraints to indicate that the unresponsive component is removed from the groupings so that it is no longer considered when coordinating testing.

In one embodiment, the electrical and mechanical system includes a heating, ventilation, and air-conditioning unit, and the components include a chiller, a fan, a valve, a duct, an airflow sensor, a thermometer, a heating coil, a vent, a pump, variable air volume boxes, a radiator, a boiler, an actuator, or any combination thereof.

Preferably, the method also includes associating a finite-state machine with each of the devices, wherein states of a finite-state machine correspond to a corresponding component test, and automatically generating the finite-state machines from the constraints.

In a second aspect of the invention, a testing system for testing an electrical and mechanical system having multiple interconnected devices each having one or more components includes multiple finite-state machines each corresponding to one of the multiple interconnected devices, wherein states of the multiple finite-state machines correspond to component tests for testing components of the multiple devices; and a scheduler for dynamically controlling the multiple finite-state machines to execute the component tests such that a total execution time of the multiple component tests is minimized.

In one embodiment, the testing system also includes test enabler sets comprising constraints that must be satisfied for one or more of the component tests to execute, wherein the scheduler queries the test enabler sets before starting one or more of the component tests; and test safety sets including constraints that must be satisfied for one or more of the component tests to continue running, wherein the scheduler queries the test enabler sets before stopping execution of one or more of the component tests.

Preferably, the testing system also includes a condition finite-state machine for monitoring results of the component tests and updating the constraints based on the results, and a description file comprising of physical interconnections of the one or more components and a state of each of the one or more components.

In one embodiment, the multiple finite-state machines and the condition finite-state machine communicate using asynchronous messages.

In one embodiment, the electrical and mechanical system includes a heating, ventilation, and air-conditioning unit, and the components include a chiller, a fan, a valve, a duct, an airflow sensor, a thermostat, a heating coil, a vent, a pump, variable air volume boxes, a radiator, a boiler, an actuator, or any combination thereof.

Preferably, the testing system is coupled to the electrical and mechanical system over a network, such as a cloud network. In other embodiment, the testing system is coupled to the electrical and mechanical system over a local area network, or is even housed at a same location as the electrical and mechanical system.

The testing system also includes a computer-readable medium storing computer-executable instructions that execute an algorithm associated with the scheduler and the multiple finite state machines, and the constraints.

In one embodiment, each of the components has an associated test list package including one or more test lists, wherein each test list comprises a list of component tests for testing operation of a component.

In a third aspect, of the invention, a method of testing an electrical and mechanical system comprising interconnected devices, each device including one or more components, each component tested using a corresponding component test, the method includes ranking the devices based on loads on the devices; selecting a first set of conditions that allow component tests to be executed on a first set of components on devices with higher loads before component tests are executed on a second set of components on devices with smaller loads; selecting a second set of conditions that postpone execution of the component tests on the second set of components to effect the first set of conditions; and scheduling execution of the component tests using the first and second sets of conditions. Preferably, the component tests are embodied in finite-state machines. In one embodiment, the electrical and mechanical system includes a heating, ventilation, and air-conditioning unit.

BRIEF DESCRIPTION OF THE SEVERAL VIEWS OF THE DRAWINGS

The following figures are used to illustrate embodiments of the invention. In all the figures, the same label refers to the identical or a similar element.

FIGS. 4A and 4B show tables describing scheduling of component tests in accordance with one embodiment of the invention.

DETAILED DESCRIPTION OF THE INVENTION

In accordance with the principles of the invention, an electrical and mechanical system having one or more devices, each having one or more components, is tested by performing component tests on each component. The component tests are scheduled to minimize the total execution time of the component tests, and thus the testing time of the entire electrical and mechanical system. Preferably, the total system testing time is minimized by performing in parallel those component tests capable of being performed in parallel, taking into account testing constraints such as prerequisites (e.g., before monitoring air temperature from a chiller, ensuring that the cooler is on) and safety constraints (e.g., while circulating air from a fan, ensuring that a downstream duct is open) that must be continuously satisfied during system testing. In one embodiment, the system execution time is further reduced by performing component tests on components of devices having higher loads before performing component tests on components of devices having lower loads.

In one embodiment, a testing system in accordance with the invention includes (1) a language which allows specifying, for each component test, lists of prerequisites, composed using elementary prerequisites, (2) a set of parameterized finite-state machines (FSMs) whose configuration is automatically generated from the lists of prerequisites, each assigned for testing device, and (3) a safe and minimum time scheduler that dynamically coordinates and executes parallel tests by assigning the FSMs to the HVAC components and scheduling their execution time.

In operation, the results of the tests are able to be used to generate reports, dispatch maintenance crews to repair or replace faulty components, or automatically swap in redundant components, to name only a few such actions.

Figure 1:
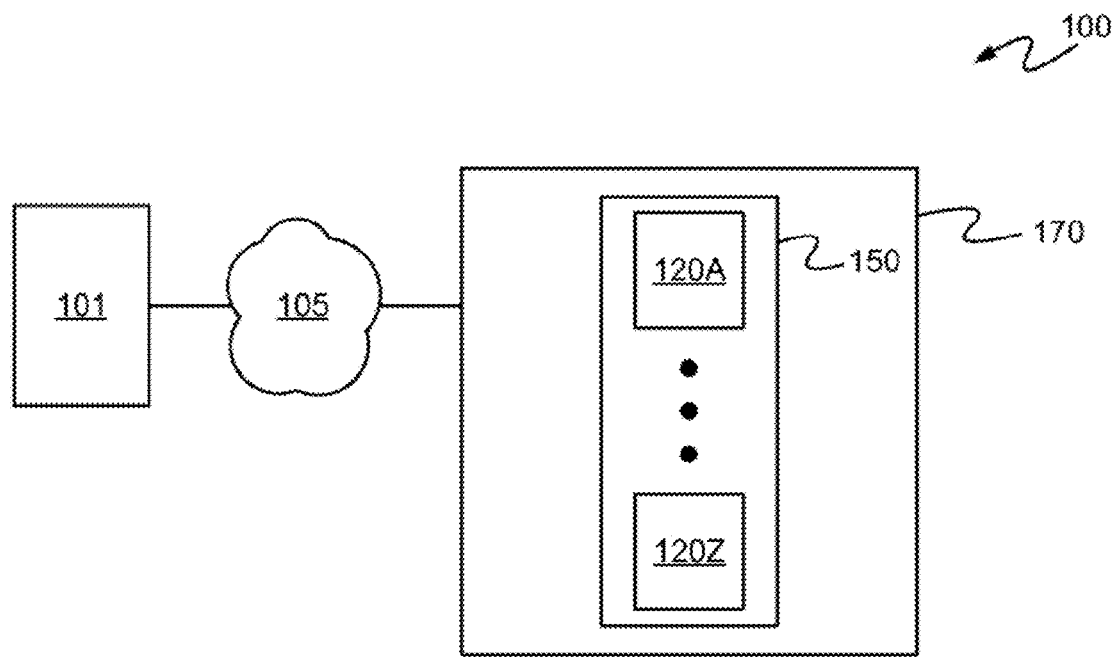
FIG. 1 is a high-level diagram of a testing platform coupled over a cloud network to an electrical and mechanical system in accordance with one embodiment of the invention.

FIG. 1 shows a testing platform 101 coupled over a cloud network 105 to an electrical and mechanical system 150, with multiple electrical and mechanical devices 120A-Z, housed in a structure 170, in accordance with one embodiment of the invention. In one embodiment, the electrical and mechanical system 150 comprises a heating, ventilation, and air-conditioning (HVAC) system that services a building 170. While FIG. 1 shows a single electrical and mechanical system 150, it will be appreciated that in other embodiments, a testing platform is configured to test multiple electrical and mechanical devices within a single building or across multiple locations. As explained in more detail below, the electrical and mechanical devices 120A-Z each includes one or more components tested using the testing platform. For example, when the electrical and mechanical system is an HVAC unit, the components include filters, pumps, input and exhaust fans, heating coils, actuators, cooling towers, chillers, dampers, sensors, variable air volume terminal (VAV) units, and the like, each tested according to a corresponding "Component test." After reading this disclosure, those skilled in the art will recognize other components that are able to be tested in-situ in accordance the principles of the invention.

In one embodiment, the testing platform 101 tests the components of the electrical and mechanical devices 120A-Z using a scheduling algorithm that efficiently schedules and dispatches Component tests in a way that minimizes the total execution time of the Component tests, while ensuring the safety of the electrical and mechanical system 150. Preferably, the testing system 101 only starts Component tests when certain prerequisites or constraints ("Test enabler sets") are met and ensures the safety by allowing Component tests to continue running only when other constraints ("Test safety sets") are met. Preferably, the states of the components (e.g., on, off, open, closed, unresponsive) are tested before some Component tests are executed and continuously monitored while Component tests are executing.

In some embodiments, constraints are able to be set so that Component tests are executed at only specified times. For example, constraints can be set so that tests are executed only between certain hours, when a building is unoccupied, such as late at night or on weekends.

By implementing the testing platform 101 in the cloud, customers do not have to install extra hardware for automated commissioning. Further cloud-based equipment testing enables test results to be analyzed from anywhere, not just on site. Nevertheless, in other embodiments, the testing platform 101 is implemented on site, housed in the structure 170 or coupled to the electrical and mechanical system 150 by local area networks, Ethernet networks, or other systems.

Figure 2:
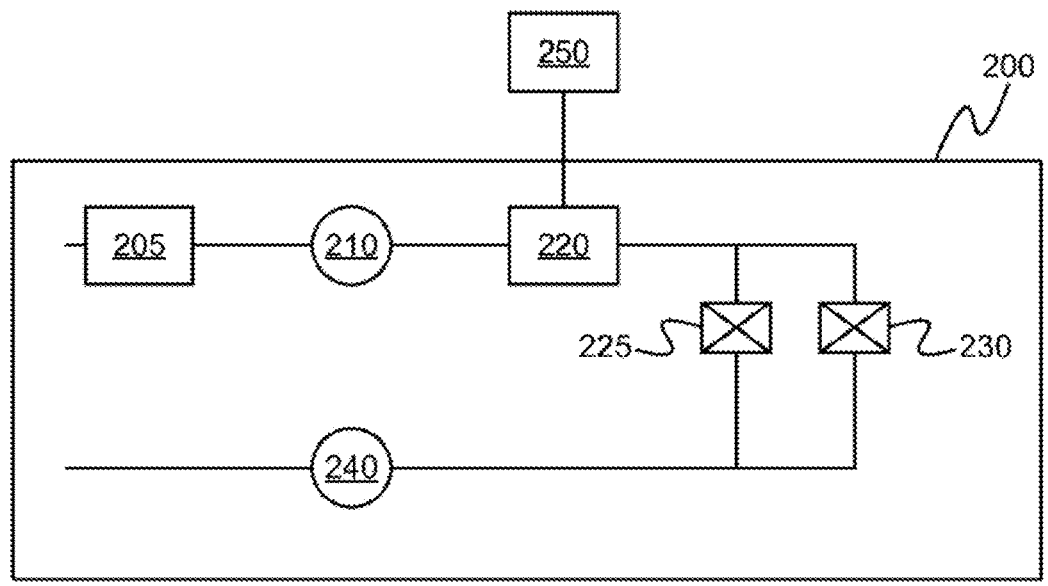
FIG. 2 is a high-level diagram of an HVAC system, using to explain the principles of the invention.

FIG. 2 is a diagram of an HVAC unit 200 used to illustrate principles of the invention. The HVAC unit 200 comprises a filter 205 coupled in series with an input fan 210, coupled in series with a chiller 220, coupled in parallel to different zones in a building through dampers 225 and 230, both of which are coupled in series to an exhaust fan 240. The chiller 220 is coupled to a water tower 225. It will be appreciated that for the fans 210 and 240 to be safely tested (e.g., so that pressure does not build within the HVAC unit 200 to unacceptable levels) the dampers 225 and 230 must both be open. In this example, the state of dampers being open is a prerequisite (constraint) stored, in one embodiment, in a Test enabler set on the testing platform. The testing platform ensures that this prerequisite is met before executing the Component test for testing the fans 210 and 240.

It will also be appreciated that the total testing time of all the Component tests on the HVAC unit 200 can be reduced by performing Component tests on the dampers 225 and 230, in parallel, rather than in series. That is, the Component tests for the dampers overlap for at least a portion of their execution times.

Figure 3:
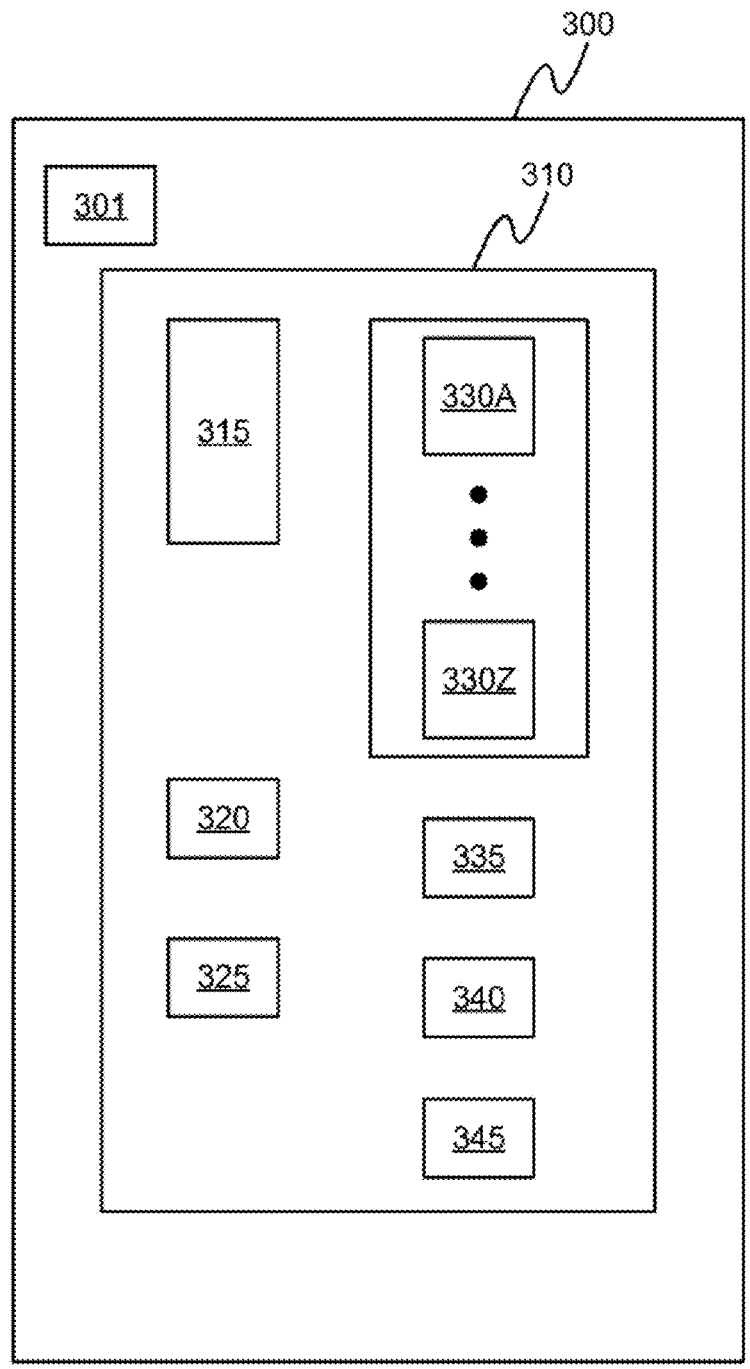
FIG. 3 is a block diagram of components of a testing platform in accordance with one embodiment of the invention.

FIG. 3 is a block diagram of a testing platform 300 in accordance with one embodiment of the invention. The testing platform 300 includes a processor 301, and a computer-readable medium 310 containing both computer-executable instructions and storage. The computer-readable medium 310 stores a scheduler 315, an electrical and mechanical system descriptor file 320, a test library 325, finite-state machines (FSMs) 330A-Z, a condition FSM 335, Test enabler sets 340, and Test safety sets 345, all described in more detail below. The computer-executable instructions, when executed by the processor 301, execute the steps of scheduling algorithms in accordance with embodiments of the invention, as well as execute the FSMs.

The electrical and mechanical system descriptor file 305 contains a list of the components of an electrical and mechanical system (e.g., 200), possible states of each component, and the interconnections between the components (e.g., physical layout). As one example, the file 320 describes that a chiller A is connected on the water side to a cooling tower CT3 and a pump P4 and on the air side to an air handling unit AH4, which is serving VAV boxes 57 to 78. The file 320 indicates that AH4 has a load of 22 (e.g., the number of VAV boxes that it serves), which the scheduler 301 preferably uses to schedule the component tests on AH4. In different embodiments, the file 320 is pulled or inferred from business service management (BSM) data, is provided by a user, or is provided or otherwise determined from a combination of both.

The test library 310 contains component tests. Each component test includes finite-time constrained operations of one or more system components. A component test is expected to affect an output, state, or both of a component in response to changes in the input to the component. As one example, a VAV Airflow Sensor Test (AFS test) measures the response of a VAV box's airflow sensor in response to the movement of its damper position through a set of sequence of positions. The AFS test passes when the airflow increases along the opening on the damper and fails when no increase is measured. As a second example, a heater is tested by changing a temperature control setting through a range of values and using a thermostat to measure the generated temperature. The heater Component test is passed when the measured temperature corresponds to the control setting and fails if it does not.

Each of the tests has zero or more constraints, including, as described above, "Test enabler sets," which must be satisfied for a test to run, and "Test safety sets," which must be maintained during testing to ensure the safety of the entire electrical and mechanical system. As an illustration of test enabler sets, cold temperature must be provided for testing a VAV box, such as by turning on a chiller or packaged air conditioning unit. In one embodiment, this is achieved by enabling a supply air temperature override signal and sending an override set point signal to the chiller or AC unit to force the chiller or AC unit to lower its supply side temperature. As an illustration of Test safety sets, when providing cold air from a packaged AC unit or air handler, the duct pressure must be controlled to a safe level. The pressure in the duct can be relieved by locking open the dampers of a specified number of VAV boxes connected to the unit which are not undergoing automated testing. It will be appreciated that, for a given test, Test enabler sets and Test safety sets can have common constraints.

FIGS. 4A and 4B show, respectively, Table 1 and Table 2, illustrating constraints used by a scheduler to coordinate the execution of component tests Test 1, Test 2, and Test 3 on VAV boxes VAVC-1, VAVC-2, and VAVC-3 (not shown) in accordance with one embodiment of the invention. In this example, VAVC-1, VAVC-2, and VAVC-3 depend on a prerequisite from a packaged unit that requires a Safety set of size 1. VAVC-1 is tested by running one test, VAVC-2 is tested by running two tests, and VAVC-3 is tested by running three tests. Referring to FIG. 4A, based on criteria in a Safety set, at time T1, Component Test 1 is run on VAVC-1 and VAVC-2, while no tests are run on VAVC-3. Next, at Time T2, based on criteria in the Safety set, no tests are run on VAVC-1, Component Test 2 is run on VAVC-2, and Component Test 1 is run on VAVC-3. Next, at Time T3, based on criteria in the Safety set, no tests are run on VAVC-1, VAVC-2 is placed in an Idle state, and Component Test 2 is run on VAVC-3. Next, at Time T4, all the criteria in the Safety set have been met. At this time, Component Test 3 is run on VAVC-3.

Referring to FIG. 4B, based on criteria in a Safety set, at time T1, no tests are run on VAVC-1, and Component Test 1 is run on VAVC-2 and VAVC-3. Next, at Time T2, based on criteria in the Safety set, no tests are run on VAVC-1, and Component Test 2 is run on VAVC-2 and VAVC-3. Next, at Time T3, based on criteria in the Safety set, Component Test 3 is run on VAVC-3.

In preferred embodiments, finite-state machines (FSMs) are used to schedule, dispatch, coordinate, and monitor Component tests. An FSM is assigned to each device. For a device, the FSM has states corresponding to a sequence of actions to be performed on the device. Thus, in accordance with the embodiments, a scheduler continuously issues instructions to coordinate the FSMs. In this way, the system allows for more resilience to real-world failures than the execution on a pre-planned system-wide action sequence.

Figure 5:
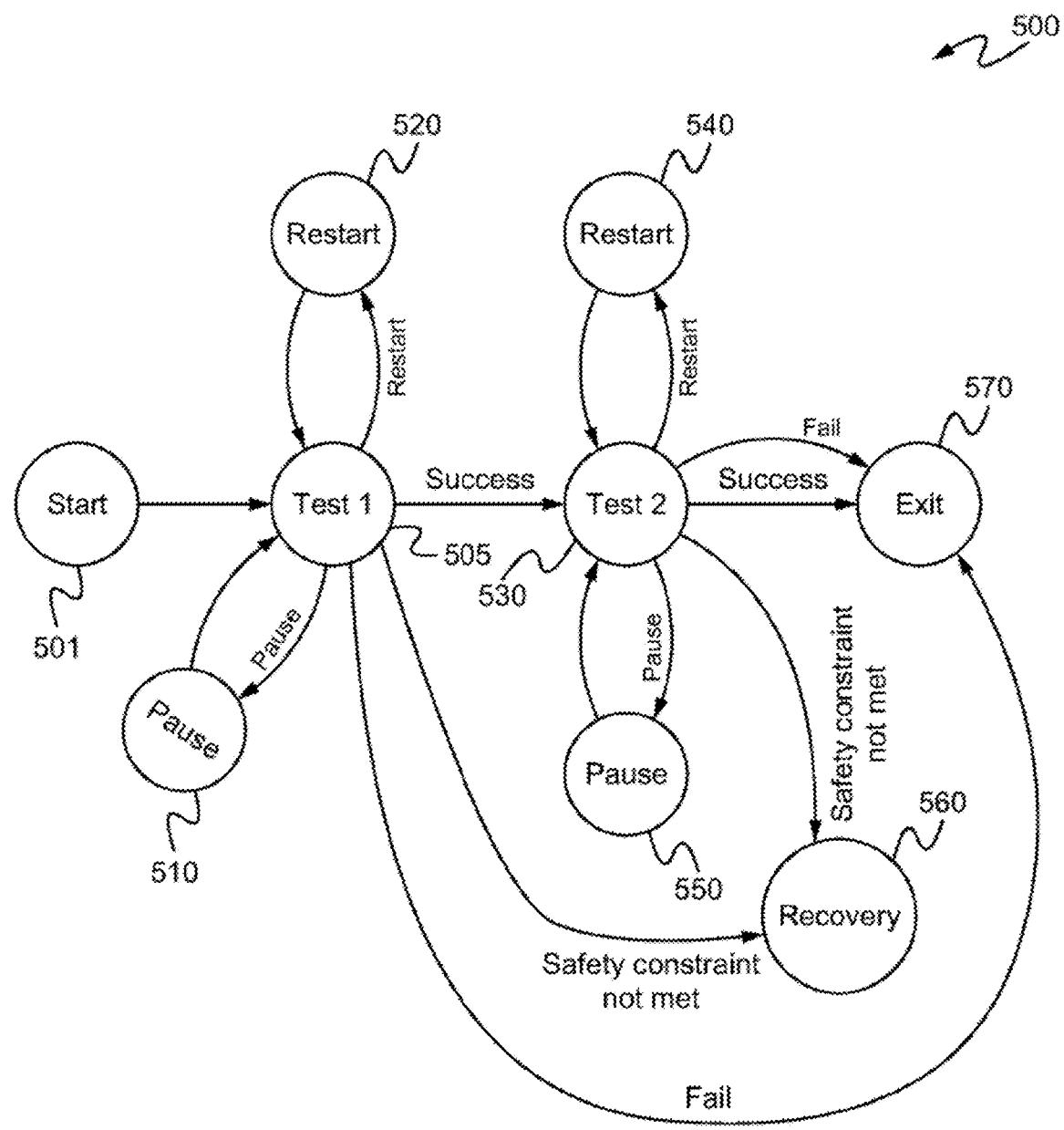
FIG. 5 shows the states of a finite-state machine for executing components tests in accordance with one embodiment of the invention.

FIG. 5 illustrates an FSM 500 for testing a device (e.g., a fan) having 2 components (e.g., an actuator and a speed control) in accordance with one embodiment of the invention. Thus, the fan is tested by running two tests, Test 1 and Test 2. In this example, the FSM 500 begins in the Start state 501, in which it may wait until Test enabler set constraints are met. If prerequisites exist and are met, the FSM 500 transitions to the Test 1 state 505, in which a Component Test 1 is executed. If Component Test 1 executes successfully, the FSM 500 transitions to Test 2 state 530, in which Component Test 2 is executed. If in Test state 505, Component Test 1 is paused (e.g., by a constraint changing, requiring that component wait until the completion of an event), the FSM 500 enters a Pause state 510. The FSM 500 will transition from the Pause state 510 back to the Test 1 state only after the criteria has been updated (e.g., the event triggering the pause has completed). If in Test state 505, Component Test 1 is restarted, the FSM 500 enters a Restart state 520, in which parameters for performing Test 1 are reset (e.g., re-initialized). For example, if a duct must be opened sequentially from a starting position to an ending position, the position is re-set to the starting position. If in Test state 505, events determine that a recovery is necessary, the FSM 500 transitions to a Recovery state 560, in which any recovery operations are performed, from which the FSM 500 transitions the Exit state 570. In a similar manner, the FSM 500 transitions from the Test 2 state 530 to a Restart state 540, a Pause state 550, a Recovery State 560, and the Exit state 570.

It will be appreciated that the FSM 500 is merely illustrative of one example. In accordance with the principles of the invention, other FSMs are generated, tailored to specific components, operating requirements, and specifications, to name only a few criteria.

In one embodiment, the FSM 500 receives input about Test safety sets, used for its state transitions, from a "conditions" FSM (not shown), which establishes and maintains each upstream operating condition so that operating conditions can be established as required by the current scheduler plan. This allows tests to be run when conditions can be met, avoiding external load and usage constraints. If the constraints become invalid during the lifetime of the operating conditions, the condition FSM will undo the requested operating conditions and the dependent test state machines will shut down their tests.

Isolating each device's sequence of actions into an FSM responsible for executing it provides several advantages. Instead of blindly executing the combined scheduled event sequences in order, the FSMs allow the ability to react to a failure by sending only the effected FSMs into a recovery state, allowing other FSMs to continue executing. A system using FSMs is also easily scalable. For example, in one embodiment, the testing platform is programmed using an object-oriented programming language. In these embodiments, FSMs are instantiated from easily configurable templates. Preferably, FSMs are automatically generated from criteria such as the Test enabler sets and the Test safety sets.

Figure 6:
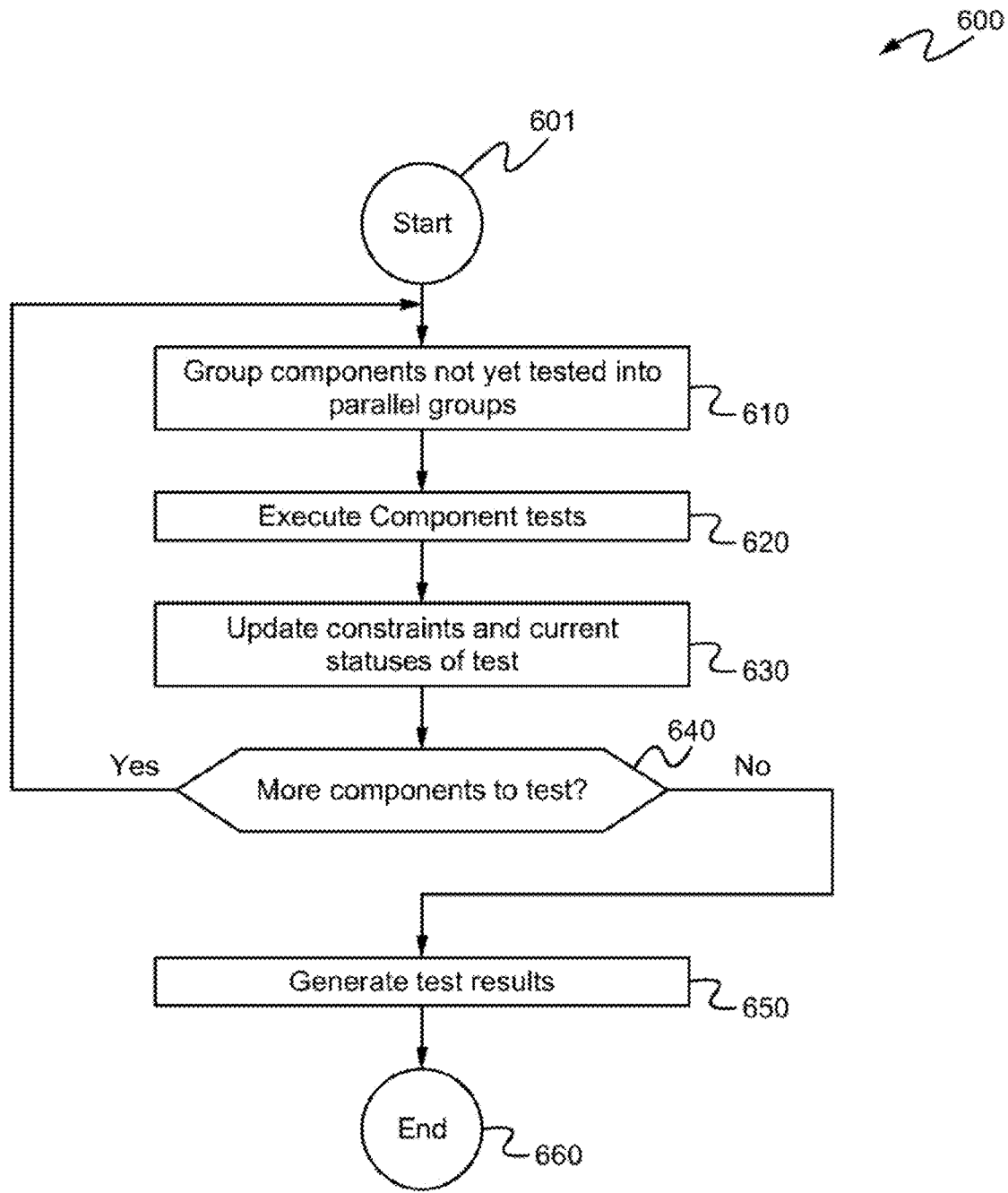
FIG. 6 is a flow chart showing the steps of an algorithm for minimizing the total testing time of a mechanical device having multiple components in accordance with one embodiment of the invention.

In one embodiment, after FSMs are generated, the scheduler dispatches the FSMs according to a scheduling algorithm that minimizes total execution time while maintaining system safety. In one embodiment, the algorithm groups Component tests for components capable of executing in parallel based on the system constraints. For example, in FIG. 2, the ducts 225 and 230 are able to be tested in parallel. FIG. 6 shows the steps 600 of an algorithm in accordance with one embodiment. After the start step 601, in the step 610 the Component tests for each device are grouped such that, based on the current constraints, Component tests in each group are capable of being executed in parallel. For each device, a component test is removed from a group once it has completed or it is determined that the device is non-responsive. Next, in the step 620, the Component tests are executed (e.g., using the FSMs) according to the groupings. Next, in the step 630 the results of the Component tests are monitored, and in the step 640, the constraints and current status of the Component tests (e.g., paused, completed, etc.) are updated. It will be appreciated that, in some embodiments statuses and states are updated asynchronously, such as using a "condition" FSM described below. Next, in the step 650, it is determined whether more devices are to be tested. If more devices are to be tested, the method loops back to the step 610. Otherwise, the method continues to the step 650, in which a test results report is generated, from which the method continues to the step 660, in which it ends.

It will be appreciated that while FIG. 6 shows sequential steps, monitoring and updates (e.g., step 630) are able to be performed asynchronously, such as by using asynchronous message passing.

It will be also appreciated that the steps 600 are merely exemplary. Like all of the algorithms described herein, in different embodiments, some of the steps can be deleted, others can be added, some can be combined, and the order can be changed.

It will be appreciated that other scheduling algorithms are able to be used in accordance with the present invention. For example, in accordance with another embodiment, an algorithm schedules events by iteratively selecting one that requires the most overloaded resource (e.g., device) to run. The algorithm is thus easily scalable. The algorithm uses a heuristic based on the assumption that by scheduling component tests and other events on overloaded resources earlier, those resources will have a relatively reduced load later in the schedule. Thus, the schedule will not be unnecessarily extended by a chain of events that must occur serially (and could have been started sooner), at the end of the schedule. Additionally, due to its iterative nature, the schedule is able to be made "on the fly" and adjusts itself based on the state of the system part way through the occurrence of events. Thus, this solution to minimizing the testing time is characterized as a dynamic constraint satisfaction problem (DCSP) rather than a CSP.

When certain conditions involve the necessary delaying of other events (for instance, delaying a test on a VAVC because it must demand cold air from its supplying packaged unit so another test depending on the cold air can run), the algorithm for minimizing the total testing time can be split into two phases. The first phase involves selecting the conditions that will allow events on the most overloaded resources to run, and then selecting events on the least overloaded resources to postpone in order to create the necessary conditions. In the second phase, using the set of conditions that are present in the system, events are selected with the intention of reducing the load of the most overloaded resources as quickly as possible, that is, by executing the events on the most overloaded resources before executing the events on the less overloaded resources. Depending on the reliability and latency of creating a given condition, these phases can be more or less tightly coupled. If conditions can be created instantaneously, there is no need to decouple the two phases, as conditions can be created with a specific test in mind. However, if many events can occur in the time span it takes to create a single condition, or the time it takes to create a condition is not well-known, the conditions should be chosen such that a pool of tests depending on the overloaded resources will be capable of running.

Extra conditions may be enforced on the scheduler if the tested system is fully operational. For instance, in an HVAC system, the scheduler can add constraints to avoid times when some or all of the serviced building are occupied. The scheduler can also avoid times when the upstream dependencies of the systems of the system are fully loaded and thus would suffer in performance when trying to create testing conditions.

Figure 7:
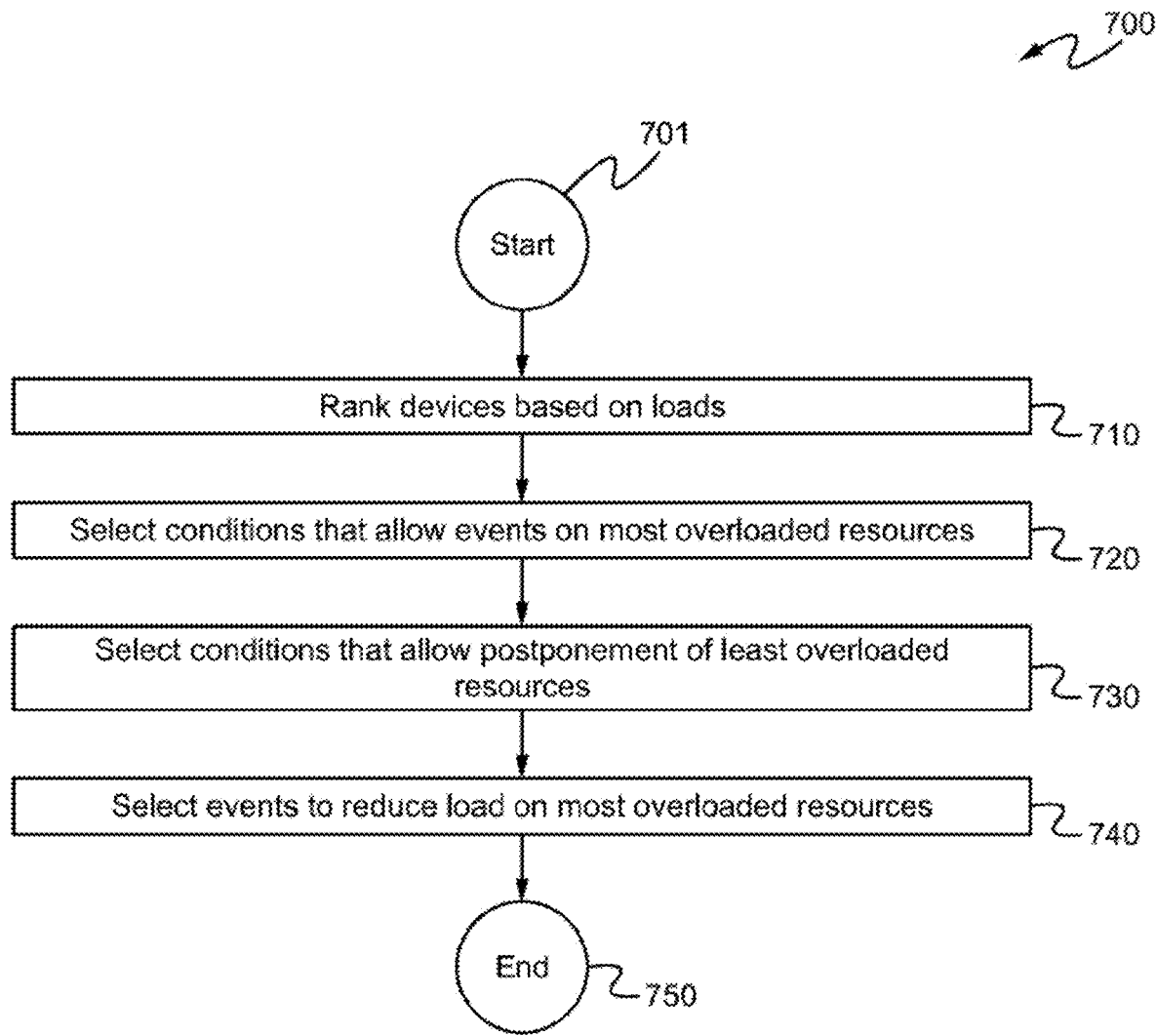
FIG. 7 is a flow chart showing the steps of an algorithm for minimizing the total testing time of an electrical and mechanical device having multiple components in accordance with another embodiment of the invention.

FIG. 7 shows the steps 700 of an algorithm in accordance with one embodiment of the invention. After the start step 701, in the step 710, devices are ranked based on their loads, with devices having higher loads ranked higher than devices having smaller loads. Next, in the step 720, conditions that allow events on the most overloaded resources to run are selected. Next, in the step 730, conditions that allow events on the least overloaded resources to postpone are selected. Together, the steps 720 and 730 create the necessary conditions. Next, in the step 740, events are selected to reduce the load on the most overloaded resources.

In one embodiment, the loads are reduced on the most overloaded resources by running component tests on the most overloaded resources earlier in the testing cycle than tests on the least overloaded resources. As used herein, loads can be computational (e.g., a number of computational steps for taking an action on a device), electrical (e.g., a current drawn or a voltage sourced), mechanical (e.g., a total number of devices coupled to a component), or some combination of these, to name only a few examples.

In one embodiment, the algorithm of FIG. 7 is stored on a computer-readable medium (e.g., 310, FIG. 3) as computer-readable instructions for performing the sequence of steps 700 executed by a processor (e.g., 301, FIG. 3). Preferably, states of the resources during events (e.g., during component testing) are embodied in FSMs, such as shown in FIG. 5.

For an electrical and mechanical system having multiple devices, each having components, a scheduler coordinates execution of separate component tests, by ensuring that the total system testing time is reduced while maintaining safety during testing. A descriptor file is parsed to determine the components and their physical interconnections. Component tests are determined for each component, and constraints are determined for, among other things, ensuring system safety during testing. The constraints are used to generate finite-state machines, each corresponding to testing a device, and thus the device's separate components. The scheduler executes the FSMs according to an algorithm, which constantly monitors and updates the constraints to ensure proper testing. Finally, the results of the component tests are analyzed, to generate reports, dispatch service personnel to repair or replace malfunctioning equipment, or take other appropriate steps.

Systems in accordance with the invention are adaptable, relying on a scheduling heuristic that is computationally inexpensive, employable on the fly to calculate the test set's next move at each step, rather than pre-computing the entire sequence of actions once at the beginning. By using elements such as finite-state machines, the systems are also robust, allowing for efficient recovery. For example, if an FSM responsible for holding a VAV box as a member of a safety set for upstream equipment prerequisite constraint goes into an error state because the box's controller is unresponsive, the scheduler recognizes this and will instantiate another FSM on another box to use instead, and plan its tests around this change accordingly. Further, because the systems use schedulers that are continuously updated, the systems are resilient to individual equipment failures which occur after scheduling is complete.

The embodiments given above are shown merely for illustration and are not meant to limit the scope of the invention. It will be readily apparent to one skilled in the art that other modifications may be made to the embodiments without departing from the spirit and scope of the invention as defined by the appended claims.

What is claimed is:

1. A non-transitory computer readable recording medium, the non-transitory computer readable recording medium having stored thereon a plurality of computer-executable instructions that, when executed, test an electrical and mechanical system comprising a plurality of interconnected devices, each device of the plurality of interconnected devices comprising one or more components, each of the one or more components being associated with a corresponding component test, the computer-executable instructions comprising:

ranking the plurality of interconnected devices in order of decreasing loads on the plurality of interconnected devices;

selecting a first set of conditions that allow component tests to be executed on a first set of components of devices of the plurality of interconnected devices having higher loads before component tests are executed on a second set of components of devices of the plurality of interconnected devices having smaller loads; and executing the component tests on the plurality of interconnected devices according to an execution schedule based on the first set of conditions.

2. The non-transitory computer readable recording medium of claim 1, wherein the computer-executable instructions further comprise:

selecting a second set of conditions that postpone execution of the component tests on the second set of components until component tests have been executed on the first set of components;

wherein the execution schedule for executing the component tests on the plurality of interconnected devices is based on the first set of conditions and the second set of conditions.

3. The non-transitory computer readable recording medium of claim 2, wherein the component tests are embodied in finite-state machines.

4. The non-transitory computer readable recording medium of claim 3, wherein the computer-executable instructions further comprise:

grouping components of the plurality of interconnected devices into groups of components capable of being tested in parallel;

wherein the execution schedule for executing the component tests is further based on criteria comprising the groups of components capable of being tested in parallel.

5. The non-transitory computer readable recording medium of claim 4, wherein the execution schedule for executing the component tests is further based on criteria comprising at least one constraint for starting execution of the component tests and at least one constraint for maintaining execution of the component tests to minimize a total execution time of the component tests.

6. The non-transitory computer readable recording medium of claim 3, wherein the execution schedule for executing the component tests is further based on criteria comprising states of the finite-state machines.

7. The non-transitory computer readable recording medium of claim 6, wherein the computer-executable instructions further comprise:
monitoring the states of the finite-state machines, and in response to a change in the state of any of the finite-state machines, updating the at least one constraint for starting execution of the component tests, or updating the at least one constraint for maintaining execution of the component tests.

8. The non-transitory computer readable recording medium of claim 7, wherein the computer-executable instructions further comprise:
detecting that one of the components is unresponsive to the corresponding component test;
placing the unresponsive component into a recovery state; and
updating the constraints to indicate that the unresponsive component is removed from the groups of components capable of being tested in parallel.

9. A testing system for testing an electrical and mechanical system comprising:
a processor; and
a computer readable medium in communication with the processor, the computer readable medium having stored thereon computer-executable instructions that, when executed by the processor, cause the processor to perform a test method, the computer-executable instructions including:
ranking the plurality of interconnected devices in order of decreasing loads on the plurality of interconnected devices;
selecting a first set of conditions that allow component tests to be executed on a first set of components of devices of the plurality of interconnected devices having higher loads before component tests are executed on a second set of components of devices of the plurality of interconnected devices having smaller loads; and
executing the component tests on the plurality of interconnected devices according to an execution schedule based on the first set of conditions.

10. The testing system of claim 9, wherein the computer-executable instructions further include:
selecting a second set of conditions that postpone execution of the component tests on the second set of components until component tests have been executed on the first set of components;
wherein the execution schedule for executing the component tests on the plurality of interconnected devices is based on the first set of conditions and the second set of conditions.

11. The testing system of claim 10, wherein the component tests are embodied in finite-state machines.

12. The testing system of claim 11, wherein the computer-executable instructions further include:
grouping components of the plurality of interconnected devices into groups of components capable of being tested in parallel;
wherein the execution schedule for executing the component tests is further based on criteria comprising the groups of components capable of being tested in parallel.

13. The testing system of claim 12, wherein the execution schedule for executing the component tests is further based on criteria comprising at least one constraint for starting execution of the component tests and at least one constraint for maintaining execution of the component tests to minimize a total execution time of the component tests.

14. The testing system of claim 11, wherein the execution schedule for executing the component tests is further based on criteria comprising states of the finite-state machines.

15. The testing system of claim 14, wherein the computer-executable instructions further comprise:
monitoring the states of the finite-state machines, and
in response to a change in the state of any of the finite-state machines, updating the at least one constraint for starting execution of the component tests, or updating the at least one constraint for maintaining execution of the component tests.

16. The testing system of claim 15, wherein the computer-executable instructions further comprise:
detecting that one of the components is unresponsive to the corresponding component test;
placing the unresponsive component into a recovery state; and
updating the constraints to indicate that the unresponsive component is removed from the groups of components capable of being tested in parallel.

* * * * *